United States Patent
Tang

(10) Patent No.: US 11,050,445 B1
(45) Date of Patent: Jun. 29, 2021

(54) MOBILE TERMINAL AND IMPLEMENTATION METHOD FOR BANDWIDTH EXTENSION TO LTE BAND B42

(71) Applicant: JRD Communication (Shenzhen) LTD., Shenzhen (CN)

(72) Inventor: Yanbo Tang, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 16/769,734

(22) PCT Filed: Dec. 3, 2018

(86) PCT No.: PCT/CN2018/118910
§ 371 (c)(1),
(2) Date: Jun. 4, 2020

(87) PCT Pub. No.: WO2019/109884
PCT Pub. Date: Jun. 13, 2019

(30) Foreign Application Priority Data

Dec. 4, 2017 (CN) .......................... 201711259329.X

(51) Int. Cl.
*H04B 7/02* (2018.01)
*H04L 1/02* (2006.01)
(Continued)

(52) U.S. Cl.
CPC ........... *H04B 1/0057* (2013.01); *H04B 1/401* (2013.01); *H04B 7/0404* (2013.01)

(58) Field of Classification Search
CPC ..... H04B 1/0057; H04B 1/401; H04B 7/0404
(Continued)

(56) References Cited

U.S. PATENT DOCUMENTS

| 2006/0223368 A1 | 10/2006 | Hayashi |
| 2007/0053451 A1 | 3/2007 | French et al. |

(Continued)

FOREIGN PATENT DOCUMENTS

| CN | 1496021 | 5/2004 |
| CN | 102076120 | 5/2011 |

(Continued)

OTHER PUBLICATIONS

International Search Report and the Written Opinion dated Feb. 27, 2019 From the International Searching Authority re. Application No. PCT/CN2018/118910 and Its Translation of Search Report Into English. (9 Pages).

*Primary Examiner* — Tanmay K Shah

(57) ABSTRACT

A mobile terminal and an implementation method for bandwidth extension to the LTE band B42 is provided. The mobile terminal includes: an RF circuit configured to incorporate LTE downlink three-carrier technology in a 1.7 to 2.7 GHz band, a 4*4 multi-mode multi-band antenna, and a 256 QAM encoding scheme; a B42 transmitting path and a receiving path is located on the RF circuit. The B42 transmitting path comprises a B42 RF power amplifier and a B42 power coupler, which are connected to a transmission terminal of a primary antenna on the RF circuit. The receiving path comprises a B42 transceiving filter and a diplexer that are connected to four antennas of the RF circuit.

20 Claims, 5 Drawing Sheets

(51) Int. Cl.
*H04B 1/00* (2006.01)
*H04B 1/401* (2015.01)
*H04B 7/0404* (2017.01)

(58) Field of Classification Search
USPC .......................................................... 375/267
See application file for complete search history.

(56) References Cited

U.S. PATENT DOCUMENTS

| | | |
|---|---|---|
| 2009/0117859 A1 | 5/2009 | Smith et al. |
| 2015/0131493 A1 | 5/2015 | Navalekar et al. |
| 2018/0269933 A1 | 9/2018 | Schmid et al. |
| 2019/0058999 A1* | 2/2019 | Gunasekara ...... H04W 36/0022 |
| 2019/0068234 A1* | 2/2019 | Khlat ........................ H04B 1/40 |
| 2019/0149313 A1* | 5/2019 | Khan ................. H04W 72/042 |
| | | 370/329 |

FOREIGN PATENT DOCUMENTS

| | | | |
|---|---|---|---|
| CN | 102457297 | | 5/2012 |
| CN | 103229427 | | 7/2013 |
| CN | 203399298 | | 1/2014 |
| CN | 203399298 U | * | 1/2014 |
| CN | 105553499 | | 5/2016 |
| CN | 105634569 | | 6/2016 |
| CN | 108039892 | | 5/2018 |
| WO | WO 2019/109884 | | 6/2019 |

* cited by examiner

| LTE CAT16 carrier configuration | CA_1A(2*2)-3C(4*4) | CA_3A(2*2)-7C(4*4) | CA_39A(2*2)-41C(4*4) | CA_41A(2*2)-42C(4*4) |
|---|---|---|---|---|
| 4*4MIMO frequency range | B3 downlink 1805-1880MHz | B7 downlink 2620-2690MHz | B41 downlink 2496-2690MHz | B42 downlink 3400-3600MHz |
| FDD/TDD | FDD | FDD | TDD(UL and DL configuration 2) | TDD(UL and DL configuration 2) |
| Downlink modulation scheme | 256QAM | 256QAM | 256QAM | 256QAM |
| LTE CAT16 DL data rate — Equipment maximum | 975Mbps | 975Mbps | 733Mbps | 733Mbps |
| LTE CAT16 DL data rate — Wired test | 975Mbps | 975Mbps | 733Mbps | 733Mbps |
| LTE CAT16 DL data rate — Wireless test | 975Mbps | 975Mbps | 733Mbps | 733Mbps |

FIG. 5

MOBILE TERMINAL AND IMPLEMENTATION METHOD FOR BANDWIDTH EXTENSION TO LTE BAND B42

RELATED APPLICATIONS

This application is a National Phase of PCT Patent Application No. PCT/CN2018/118910 having International filing date of Dec. 3, 2018, which claims the benefit of priority of Chinese Patent Application No. 201711259329.X filed on Dec. 4, 2017. The contents of the above applications are all incorporated by reference as if fully set forth herein in their entirety.

FIELD AND BACKGROUND OF THE INVENTION

The present invention relates to a technical field of communication technologies, and more particularly, to a mobile terminal and an implementation method for bandwidth extension to the LTE band B42.

Among current technologies, multi-mode multi-band terminal devices operating in a long-term evolution (LTE) 1.7 to 2.7 GHz band, such as B1/B2/B3/B4/B7/B30/B66/B39/B41, usually use QUALCOMM MSM8998+WTR5975 platform chips. The platform can achieve a maximum download link transmission rate of 1 gigabit per second (Gbps) through an LTE CAT16 downlink triple carrier multi-input multi-output (MIMO) technology with dual carrier 4×4 MIMO plus carrier 2×2 MIMO and a 256 quadrature amplitude modulation (QAM) encoding scheme. The platform chip, however, does not support information transmission in the B42 band and cannot meet the needs of information reception in a wider band.

Hence, improvement to current technologies is desired.

SUMMARY OF THE INVENTION

The application embodiment provides a mobile terminal and an implementation method for bandwidth extension to the LTE band B42 to support signal transmission on the B42 band.

An embodiment of the application provides

A first aspect of the application provides a mobile terminal for bandwidth extension to the LTE band B42 comprising: an RF circuit configured to incorporate LTE downlink three-carrier technology in an 1.7 to 2.7 GHz band, a 4*4 multi-mode multi-band antenna, and a 256 QAM encoding scheme, a B42 transmitting path located on the RF circuit, and a receiving path located on the RF circuit.

The B42 transmitting path is connected to a primary antenna of the RF circuit, and the receiving path is connected to four antennas of the RF circuit.

The B42 transmitting path comprises: a B42 RF power amplifier (PA) and a B42 power coupler, which are connected to a transmission terminal of the primary antenna on the RF circuit.

The receiving path comprises: a B42 transceiving (TRX) filter and a diplexer that are connected to the four antennas of the RF circuit.

In some embodiments, the receiving path comprises: a first receiving path connected to a primary antenna circuit of the RF circuit, a second receiving path connected to a secondary antenna circuit of the RF circuit, a third receiving path connected to a first MIMO antenna circuit of the RF circuit, and a fourth receiving path connected to a second MIMO antenna circuit of the RF circuit.

In some embodiments, the first receiving path includes: a first diplexer and a first B42 transceiving filter, which are connected to a transmission terminal of the primary antenna of the RF circuit;

wherein the B42 power coupler is connected between the first diplexer and the first B42 transceiving filter, and a first transceiver and an RF switch are connected between the first B42 transceiving filter and the B42 RF power amplifier.

In some embodiments, the B42 power coupler is further connected to a second transceiving and RF switch, the second transceiving and RF switch, the B42 power coupler and the first diplexer form a coupling path configured to detect transmission.

In some embodiments, the second receiving path includes:
a second diplexer and a second B42 transceiving filter, which are mutually connected, the second diplexer and the second B42 transceiving filter are connected to a transmission terminal of a secondary antenna of the RF circuit.

In some embodiments, the third receiving path includes:
a mutually connected third diplexer and a third B42 transceiving filter, wherein the third diplexer and the third B42 transceiving filter are connected to a transmission terminal of the first MIMO antenna of the RF circuit.

In some embodiments, the fourth receiving path includes:
a mutually connected fourth diplexer and a fourth B42 transceiving filter, wherein the fourth diplexer and the fourth B42 transceiving filter are connected to a transmission terminal of the second MIMO antenna of the RF circuit.

In some embodiments, a signal of the B42 band output from the B42 RF power amplifier passes the B42 transceiving filter and the B42 power coupler, and is transmitted by the primary antenna; a signal of the B42 band received by the four antennas is divided by the diplexer, filtered by the B42 transceiving filter, and received by the RF circuit.

A second aspect of the application further provides a mobile terminal for bandwidth extension to the LTE band B42, comprising:
an RF circuit configured to incorporate LTE downstream three-carrier technology in an 1.7 to 2.7 GHz band, a 4*4 multi-mode multi-band antenna design, and a 256 QAM encoding scheme;
a B42 transmitting path located on the RF circuit; and
a receiving path located on the RF circuit;
wherein the B42 transmitting path comprises: a B42 RF power amplifier and a B42 power coupler, which are connected to a transmission terminal of a primary antenna on the RF circuit;
the receiving path comprises: a B42 transceiving filter and a diplexer, which are connected to four antennas of the RF circuit.

In some embodiments, the receiving path comprises: a first receiving path connected to a primary antenna circuit of the RF circuit, a second receiving path connected to a secondary antenna circuit of the RF circuit, a third receiving path connected to a first MIMO antenna circuit of the RF circuit, and a fourth receiving path connected to a second MIMO antenna circuit of the RF circuit.

In some embodiments, the first receiving path includes:
a first diplexer and a first B42 transceiving filter, which are connected to a transmission terminal of the primary antenna of the RF circuit;
the B42 power coupler is connected between the first diplexer and the first B42 transceiving filter, and a first transceiver and an RF switch are connected between the first B42 transceiving filter and the B42 RF power amplifier.

In some embodiments, the B42 power coupler is further connected to a second transceiving and RF switch, the second transceiving and RF switch, the B42 power coupler and the first diplexer form a coupling path configured to detect transmission.

In some embodiments, the second receiving path includes:

a second diplexer and a second B42 transceiving filter, which are mutually connected, the second diplexer and the second B42 transceiving filter are connected to a transmission terminal of a secondary antenna of the RF circuit.

In some embodiments, the third receiving path includes:

a mutually connected third diplexer and a third B42 transceiving filter, wherein the third diplexer and the third B42 transceiving filter are connected to a transmission terminal of the first MIMO antenna of the RF circuit.

In some embodiments, the fourth receiving path includes:

a mutually connected fourth diplexer and a fourth B42 transceiving filter, wherein the fourth diplexer and the fourth B42 transceiving filter are connected to a transmission terminal of the second MIMO antenna of the RF circuit.

The connected fourth diplexer and the fourth B42 transceiving filter, and the fourth diplexer and the fourth B42 transceiving filter are connected to the transmission terminal of the second MIMO antenna of the RF circuit.

In some embodiments, the B42 power coupler is further connected to a second transceiving and RF switch, the second transceiving and RF switch, the B42 power coupler and the first diplexer form a coupling path configured to detect transmission.

A third aspect of the application further provides a method for realizing a mobile terminal for bandwidth extension to the LTE band B42, comprising:

configuring a B42 transmitting path and a receiving (RX) path located on an RF circuit incorporating LTE downlink three-carrier technology in an 1.7 to 2.7 GHz band, a 4*4 multi-mode multi-band antenna, and a 256 QAM encoding scheme;

the B42 transmitting path comprises: a B42 RF power amplifier and a B42 power coupler, which are connected to a transmission terminal of a primary antenna on the RF circuit;

wherein the receiving path comprises: a B42 transceiving filter and a diplexer that are connected to the four antennas of the RF circuit.

In some embodiments, the receiving path comprises: a first receiving path connected to a primary antenna circuit of the RF circuit, a second receiving path connected to a secondary antenna circuit of the RF circuit, a third receiving path connected to a first MIMO antenna circuit of the RF circuit, and a fourth receiving path connected to a second MIMO antenna circuit of the RF circuit.

In some embodiments, the first receiving path includes:

a first diplexer and a first B42 transceiving filter, which are connected to a transmission terminal of the primary antenna of the RF circuit;

the B42 power coupler is connected between the first diplexer and the first B42 transceiving filter, and a first transceiver and an RF switch are connected between the first B42 transceiving filter and the B42 RF power amplifier.

In some embodiments, the second receiving path includes:

a second diplexer and a second B42 transceiving filter, which are mutually connected, wherein the second diplexer and the second B42 transceiving filter are connected to a transmission terminal of a secondary antenna of the RF circuit.

The third receiving path comprises:

a mutually connected third diplexer and a third B42 transceiving filter, wherein the third diplexer and the third B42 transceiving filter are connected to a transmission terminal of the first MIMO antenna of the RF circuit;

The fourth receiving path comprises:

a mutually connected fourth diplexer and a fourth B42 transceiving filter, wherein the fourth diplexer and the fourth B42 transceiving filter are connected to a transmission terminal of the second MIMO antenna of the RF circuit.

The application provides a mobile terminal for bandwidth extension to the LTE band B42 and an implementation method. The mobile terminal comprises: an RF circuit incorporating LTE downlink triple carrier technology in the 1.7 to 2.7 GHz band, a 4×4 multi-mode multi-band antenna design, and the 256 QAM encoding scheme, a B42 transmitting (TX) path located on the RF circuit and a receiving path located on the RF circuit. The B42 transmitting path comprises a B42 RF power amplifier and a B42 power coupler, which are connected to a transmitting end of the primary antenna on the RF circuit. The receiving path comprises: a B42 transceiving filter and a diplexer, which are connected to the four antennas on the RF circuit, respectively. The mobile terminal provided in the application supports signal transmission on the B42 band and facilitates information transmission.

BRIEF DESCRIPTION OF THE SEVERAL VIEWS OF THE DRAWINGS

FIG. 5 is a table showing test results of an LTE CAT16 provided in an embodiment of the application under different bands and different frequency division duplex (FDD)/ time division duplex (TDD) formats.

DESCRIPTION OF SPECIFIC EMBODIMENTS OF THE INVENTION

The following is a clear and comprehensive description of the technical solutions in the embodiments of the application with reference to the drawings in the embodiments of the application. Obviously, the embodiments described are only part of the application, not for exhaustive illustration. Based on the embodiments of the application, other embodiments which may be easily obtained by those having ordinary skills in the art without paying additional creative effort fall within the scope of the application for protection.

The application is a further detailed in the following with reference to the accompanying drawings and embodiments for clarification and illustration of the purpose, technical scheme, and advantages of the application. It should be understood that the specific embodiments described herein are intended to interpret the application rather than limit the application.

The method provided in the application to extend bandwidth of the mobile terminal to the LTE B42 band is detailed in the following. According to the capabilities of a QUALCOMM SNAPDRAGON MSM8998 chip, a WTR5975 platform, and the devices' status in the current industry, the downlink 4*4MIMO design of the 3.4-3.6 GHz band is verified by selecting the 3GPP-compliant 3.4-3.6 GHz band B42. The mobile device supports the TD-LTE CAT16 standard using triple carrier aggregation with two carrier 4*4 MIMO in B42 band and a single carrier 2*2 MIMO in band B41, that is, CA_41A (2*2 MIMO)-42C (4*4 MIMO). The present application is realized by adding a B42 supportive RF circuit to a 4G 1.7 to 2.7 GHz multi-mode multi-band terminal with an antenna path being modified.

Figure 1:
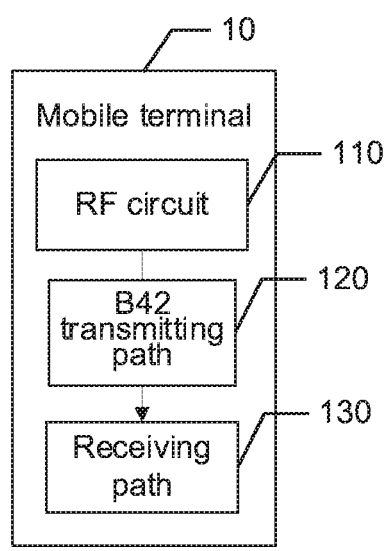
FIG. 1 is a schematic diagram showing a structure of a mobile terminal for bandwidth extension to the LTE band B42 provided in an embodiment of the application.

A first embodiment provided in the application is a mobile terminal for bandwidth extension to the LTE band B42. As shown in FIG. 1, the mobile terminal 10 includes: an RF circuit 110 incorporating LTE downlink triple carrier technology in the 1.7 to 2.7 GHz band, a 4×4 multi-mode multi-band antenna design, and a 256 QAM encoding scheme, a B42 transmitting (TX) path 120 located on the RF circuit, and a receiving (RX) path 130 located on the RF circuit.

Figure 2:
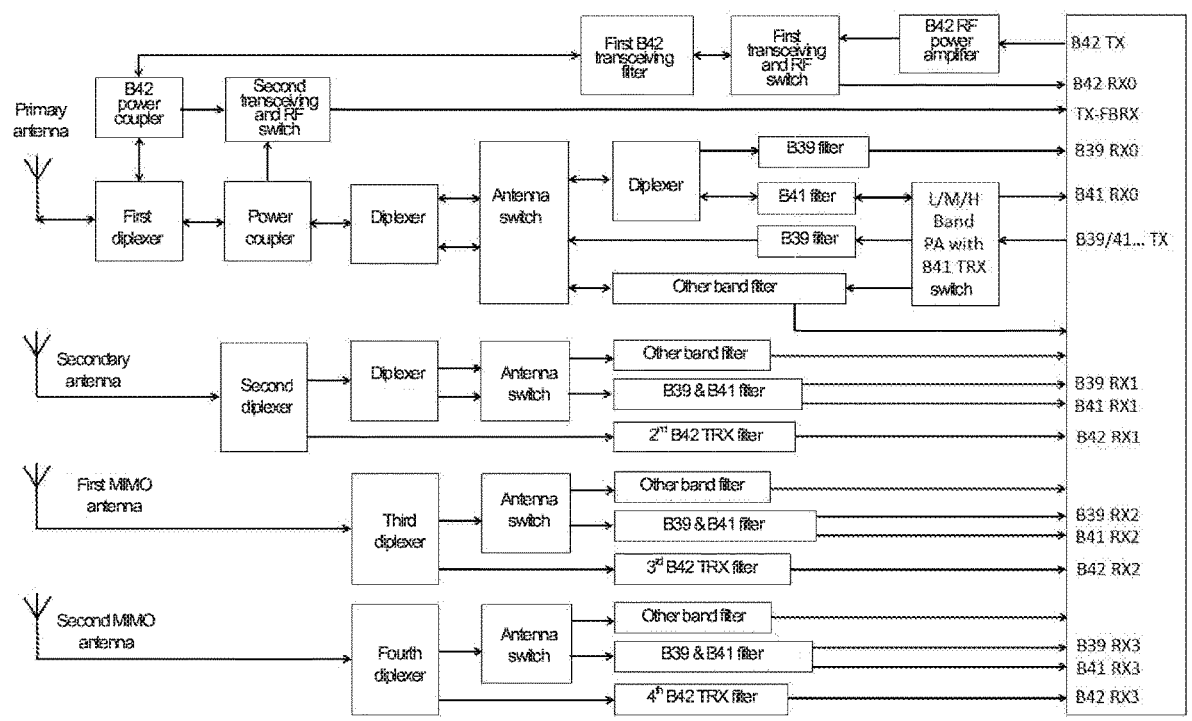
FIG. 2 is a schematic diagram of an RF circuit in a mobile terminal for bandwidth extension to the LTE band B42 provided in an embodiment of the application.

With cross reference to FIG. 2, the B42 transmitting path 120 comprises a B42 RF power amplifier (PA) and a B42 power coupler, which are connected to a transmission terminal of a primary antenna on the RF circuit. The receiving path 130 comprises a B42 transceiving (TRX) filter and a diplexer, which are connected to the four antennas of the RF circuit.

The B42 transmitting path 120 is used to facilitate information transmission on the B42 band, and the receiving path on the four antennas is used to facilitate information receiving on the B42 band. With cross reference to FIG. 2, in some embodiments, the B42 transmitting path 120 (B42 TX) is connected to the primary antenna of the RF circuit. The receiving path is located on the four antennas of the RF circuit. Specifically, the receiving path comprises a first receiving path (B42 RX0) connected to the primary antenna circuit of the RF circuit, and a second receiving path (B42 RX1) connected to a secondary antenna circuit of the RF circuit, a third receiving path (B42 RX2) connected to a first MIMO antenna circuit of the RF circuit, and a fourth receiving path (B42 RX3) connected to a second MIMO antenna circuit of the RF circuit.

A signal in the B42 band output from the B42 RF power amplifier, after passing through the B42 transceiving (TRX) filter and the B42 power coupler, is transmitted by the primary antenna. The signal in the B42 band is received on the four antennas, divided by the diplexer, and filtered by the B42 transceiving filter.

Specifically, the first receiving path (B42 RX0) comprises:

a first diplexer and the first B42 transceiving filter, which are connected to the transmission terminal of the primary antenna of the RF circuit. As shown in FIG. 2, the first receiving path further includes the B42 power coupler and a first transceiving and RF switch.

The B42 power coupler is connected between the first diplexer and the first B42 transceiving filter, and the first transceiving and RF switch is connected between the first B42 transceiving filter and the B42 RF power amplifier.

In some embodiments, to obtain a better signal transmission and reception, the B42 power coupler is further connected with a second transceiving and RF switch. The second transceiving and RF switching switch, the B42 power coupler, and the first diplexer form a coupling path, which is used to detect transmission radiation.

In some embodiments, the second receiving path includes:

a mutually-connected second diplexer and a second B42 transceiving filter. The second diplexer and the second B42 transceiving filter are connected to a transmission terminal of a secondary antenna of the RF circuit.

In some embodiments, the third receiving path includes:

a mutually-connected third diplexer and a third B42 transceiving filter. The third diplexer and the third B42 transceiving filter are connected to a transmission terminal of the first MIMO antenna of the RF circuit.

In some embodiments, the fourth receiving path includes:

a mutually-connected fourth diplexer and a fourth B42 transceiving filter. The fourth diplexer and the fourth B42 transceiving filter are connected to a transmission terminal of the second MIMO antenna of the RF circuit.

Figure 3:
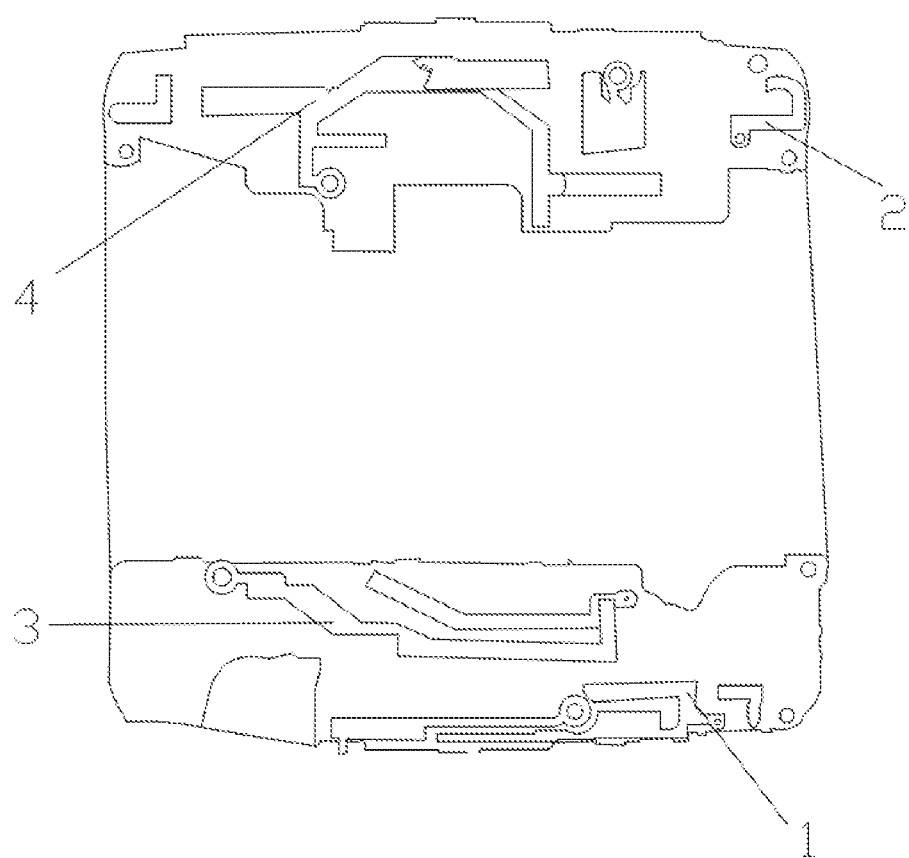
FIG. 3 is a schematic diagram showing a layout of an antenna module in the mobile terminal provided in an embodiment of the application.

In one specific embodiment, the arrangement of the antennas associated with the four receiving paths is modified from the original 4×4 MIMO antennas in the 1.7 to 2.7 GHz band. Each of the four antennas additionally supports the 3.4-3.6 GHz band, while maintaining performance on other typical bands. As shown in FIG. 3, the capability of receiving the B42 band signal is achieved by modifying layout of the four antennas including the first receiving path 1, the second receiving path 2, the third receiving path 3, and the fourth receiving path 4, to provide capability that support the 3.4-3.6 GHz band.

Figure 4:
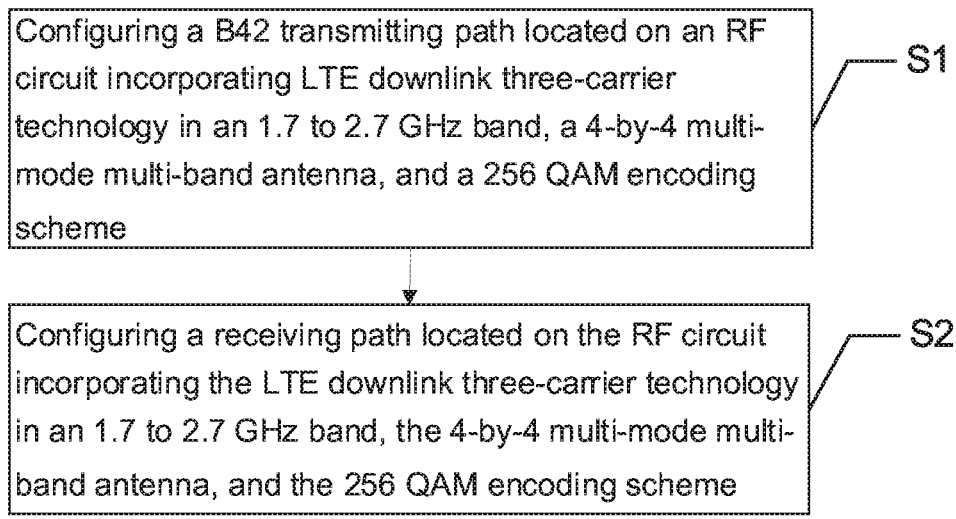
FIG. 4 is a schematic diagram showing a flowchart of an embodiment of an implementation method for a mobile terminal for bandwidth extension to the LTE band B42 provided in an embodiment of the application.

A second embodiment provided in the application is an implementation method for realizing a mobile terminal for extending B42 band bandwidth. As shown in FIG. 4, the implementation method includes:

Step S1: configuring a B42 transmitting path located on an RF circuit incorporating LTE downlink three-carrier technology in a 1.7 to 2.7 GHz band, a 4*4 multi-mode multi-band antenna, and a 256 QAM encoding scheme;

Step S2: configuring a receiving path located on the RF circuit incorporating the LTE downlink three-carrier technology in the 1.7 to 2.7 GHz band, the 4*4 multi-mode multi-band antenna, and the 256 QAM encoding scheme;

Specifically, the B42 transmitting path comprises a B42 RF power amplifier and a B42 power coupler, which are connected to a transmission terminal of a primary antenna on the RF circuit.

The receiving path comprises: a B42 transceiving filter and a diplexer which are connected to the four antennas of the RF circuit.

The receiving path comprises: a first receiving path connected to a primary antenna circuit of the RF circuit, a second receiving path connected to a secondary antenna circuit of the RF circuit, a third receiving path connected to a first MIMO antenna circuit of the RF circuit, and a fourth receiving path connected to a second MIMO antenna circuit of the RF circuit.

Specifically, the first receiving path includes:

a first diplexer and a first B42 transceiving filter, which are connected to a transmission terminal of the primary antenna of the RF circuit;

the B42 power coupler is connected between the first diplexer and the first B42 transceiving filter, and a first transceiver and an RF switch are connected between the first B42 transceiving filter and the B42 RF power amplifier.

The second receiving path comprises:

a second diplexer and a second B42 transceiving filter, which are mutually connected. The second diplexer and the second B42 transceiving filter are connected to a transmission terminal of a secondary antenna of the RF circuit.

The third receiving path comprises:

a mutually connected third diplexer and a third B42 transceiving filter, wherein the third diplexer and the third B42 transceiving filter are connected to a transmission terminal of the first MIMO antenna of the RF circuit.

The fourth receiving path comprises:

a mutually connected fourth diplexer and a fourth B42 transceiving filter. The fourth diplexer and the fourth B42 transceiving filter are connected to a transmission terminal of the second MIMO antenna of the RF circuit.

With reference to FIG. 5, FIG. 5 is a table showing test results of an LTE CAT16 provided in an embodiment of the application under different bands and different frequency division duplex (FDD)/time division duplex (TDD) formats.

As shown in FIG. 5, the mobile terminal and the implementation method provided in the application in the FDD band can easily achieve 1 Gbps throughput. TDD can achieve different throughput values with different settings, which all meet the requirements of the terminal supporting B42 band signal transmission.

The application provides a mobile terminal and an implementation method for bandwidth extension to the LTE band B42. The mobile terminal comprises: an RF circuit incorporating LTE downlink triple carrier technology in the 1.7 to 2.7 GHz band, a 4×4 multi-mode multi-band antenna design, and the 256 QAM encoding scheme, a B42 transmitting path located on the RF circuit and a receiving path located on the RF circuit. The B42 transmitting path comprises a B42 RF power amplifier and a B42 power coupler, which are connected to a transmitting end of the primary antenna on the RF circuit. The receiving path comprises: a B42 transceiving filter and a diplexer, which are connected to the four antennas on the RF circuit, respectively. The mobile terminal provided in the application supports signal transmission on the B42 band and can be achieved though improving the current RF circuit, which is very simple and satisfies the need for users to transmit information over larger bandwidths, and facilitates information transmission between mobile terminals for users.

It can be appreciated that a person of ordinary skill in the art may equivalently replace or modify the technical solutions of the application and the concept of the invention. Any equivalent replacement or modification based on the technical solutions and the invention are included in the scope of the accompanying claims of the invention.

What is claimed is:

1. A mobile terminal for bandwidth extension to the LTE band B42 comprising:
   an RF circuit configured to incorporate LTE downlink three-carrier technology in a 1.7 to 2.7 GHz band, a 4*4 multi-mode multi-band antenna, and a 256 QAM encoding scheme;
   a B42 transmitting path located on the RF circuit; and
   a receiving path located on the RF circuit;
   wherein the B42 transmitting path is connected to a primary antenna of the RF circuit, and the receiving path is connected to four antennas of the RF circuit;
   the B42 transmitting path comprises: a B42 RF power amplifier and a B42 power coupler, which are connected to a transmission terminal of the primary antenna on the RF circuit; and
   the receiving path comprises: a B42 transceiving filter and a diplexer that are connected to the four antennas of the RF circuit.

2. The mobile terminal for bandwidth extension to the LTE band B42 of claim 1, wherein the receiving path comprises:
   a first receiving path connected to a primary antenna circuit of the RF circuit;
   a second receiving path connected to a secondary antenna circuit of the RF circuit;
   a third receiving path connected to a first MIMO antenna circuit of the RF circuit; and
   a fourth receiving path connected to a second MIMO antenna circuit of the RF circuit.

3. The mobile terminal for bandwidth extension to the LTE band B42 of claim 2, wherein the first receiving path comprises:
   a first diplexer and a first B42 transceiving filter, which are connected to a transmission terminal of the primary antenna of the RF circuit;
   wherein the B42 power coupler is connected between the first diplexer and the first B42 transceiving filter, and a first transceiver and an RF switch are connected between the first B42 transceiving filter and the B42 RF power amplifier.

4. The mobile terminal for bandwidth extension to the LTE band B42 of claim 3, wherein the B42 power coupler is further connected to a second transceiving and RF switch, the second transceiving and RF switch, the B42 power coupler, and the first diplexer form a coupling path configured to detect transmission.

5. The mobile terminal for bandwidth extension to the LTE band B42 of claim 2, wherein the second receiving path comprises:
   a second diplexer and a second B42 transceiving filter, which are mutually connected, the second diplexer and the second B42 transceiving filter are connected to a transmission terminal of a secondary antenna of the RF circuit.

6. The mobile terminal for bandwidth extension to the LTE band B42 of claim 2, wherein the third receiving path comprises:
   a mutually connected third diplexer and a third B42 transceiving filter, wherein the third diplexer and the third B42 transceiving filter are connected to a transmission terminal of the first MIMO antenna of the RF circuit.

7. The mobile terminal for bandwidth extension to the LTE band B42 of claim 2, wherein the fourth receiving path comprises:
   a mutually connected fourth diplexer and a fourth B42 transceiving filter, wherein the fourth diplexer and the fourth B42 transceiving filter are connected to a transmission terminal of the second MIMO antenna of the RF circuit.

8. The mobile terminal for bandwidth extension to the LTE band B42 of claim 1, wherein a signal of the B42 band output from the B42 RF power amplifier passes the B42 transceiving filter and the B42 power coupler, and is transmitted by the primary antenna, a signal of the B42 band received by the four antennas is divided by the diplexer, filtered by the B42 transceiving filter, and received by the RF circuit.

9. A mobile terminal for bandwidth extension to the LTE band B42, comprising:

an RF circuit configured to incorporate LTE downstream three-carrier technology in a 1.7 to 2.7 GHz band, a 4*4 multi-mode multi-band antenna design, and a 256 QAM encoding scheme;

a B42 transmitting path located on the RF circuit; and a receiving path located on the RF circuit;

wherein the B42 transmitting path comprises: a B42 RF power amplifier and a B42 power coupler, which are connected to a transmission terminal of a primary antenna on the RF circuit; and the receiving path comprises: a B42 transceiving filter and a diplexer, which are connected to four antennas of the RF circuit.

10. The mobile terminal for bandwidth extension to the LTE band B42 of claim 9, wherein the receiving path comprises:

a first receiving path connected to a primary antenna circuit of the RF circuit;

a second receiving path connected to a secondary antenna circuit of the RF circuit;

a third receiving path connected to a first MIMO antenna circuit of the RF circuit; and a fourth receiving path connected to a second MIMO antenna circuit of the RF circuit.

11. The mobile terminal for bandwidth extension to the LTE band B42 of claim 10, wherein the first receiving path comprises:

a first diplexer and a first B42 transceiving filter, which are connected to a transmission terminal of the primary antenna of the RF circuit;

wherein the B42 power coupler is connected between the first diplexer and the first B42 transceiving filter, and a first transceiver and an RF switch are connected between the first B42 transceiving filter and the B42 RF power amplifier.

12. The mobile terminal for bandwidth extension to the LTE band B42 of claim 11, wherein the B42 power coupler is further connected to a second transceiving and RF switch, the second transceiving and RF switch, the B42 power coupler and the first diplexer form a coupling path configured to detect transmission.

13. The mobile terminal for bandwidth extension to the LTE band B42 of claim 10, wherein the second receiving path comprises:

a second diplexer and a second B42 transceiving filter, which are mutually connected, the second diplexer and the second B42 transceiving filter are connected to a transmission terminal of a secondary antenna of the RF circuit.

14. The mobile terminal for bandwidth extension to the LTE band B42 of claim 10, wherein the third receiving path comprises:

a mutually connected third diplexer and a third B42 transceiving filter, wherein the mutually connected third diplexer and the third B42 transceiving filter are connected to a transmission terminal of the first MIMO antenna of the RF circuit.

15. The mobile terminal for bandwidth extension to the LTE band B42 of claim 10, wherein the fourth receiving path comprises:

a mutually-connected fourth diplexer and a fourth B42 transceiving filter, wherein the fourth diplexer and the fourth B42 transceiving filter are connected to a transmission terminal of the second MIMO antenna of the RF circuit.

16. The mobile terminal for bandwidth extension to the LTE band B42 of claim 9, wherein a signal of the B42 band output from the B42 RF power amplifier passes the B42 transceiving filter and the B42 power coupler, and is transmitted by the primary antenna on the RF circuit, and a signal of the B42 band received by the four antennas on the RF circuit is divided by the diplexer, filtered by the B42 transceiving filter, and received by the RF circuit.

17. A method for realizing a mobile terminal for bandwidth extension to a LTE band B42, comprising:

configuring a B42 transmitting path and a receiving path located on an RF circuit incorporating LTE downlink three-carrier technology in a 1.7 to 2.7 GHz band, a 4*4 multi-mode multi-band antenna, and a 256 QAM encoding scheme;

wherein the B42 transmitting path comprises: a B42 RF power amplifier and a B42 power coupler, which are connected to a transmission terminal of a primary antenna on the RF circuit; and wherein the receiving path comprises: a B42 transceiving filter and a diplexer which are connected to the four antennas of the RF circuit.

18. The method for realizing the mobile terminal for bandwidth extension to the LTE band B42 of claim 17, wherein the receiving path comprises:

a first receiving path connected to the primary antenna circuit of the RF circuit;

a second receiving path connected to a secondary antenna circuit of the RF circuit;

a third receiving path connected to a first MIMO antenna circuit of the RF circuit; and a fourth receiving path connected to a second MIMO antenna circuit of the RF circuit.

19. The method for realizing the mobile terminal for bandwidth extension to the LTE band B42 of claim 17, wherein, the first receiving path includes:

a first diplexer and a first B42 transceiving filter, which are connected to the transmission terminal of the primary antenna of the RF circuit; and wherein the B42 power coupler is connected between a first diplexer and a first B42 transceiving filter, and a first transceiver and an RF switch are connected between the first B42 transceiving filter and a B42 RF power amplifier.

20. The method for realizing the mobile terminal for bandwidth extension to the LTE band B42 of claim 17, wherein a second receiving path includes:

a second diplexer and a second B42 transceiving filter, which are mutually connected, wherein the second diplexer and the second B42 transceiving filter are connected to a transmission terminal of a secondary antenna of the RF circuit;

a third receiving path comprises:

a mutually connected third diplexer and a third B42 transceiving filter, wherein the third diplexer and the third B42 transceiving filter are connected to a transmission terminal of a first MIMO antenna of the RF circuit; and a fourth receiving path comprises:

a mutually connected fourth diplexer and a fourth B42 transceiving filter, wherein the fourth diplexer and the fourth B42 transceiving filter are connected to a transmission terminal of a second MIMO antenna of the RF circuit.

* * * * *